No. 888,705. PATENTED MAY 26, 1908.
E. T. GREENFIELD.
SPEED INDICATOR.
APPLICATION FILED JUNE 22, 1907.
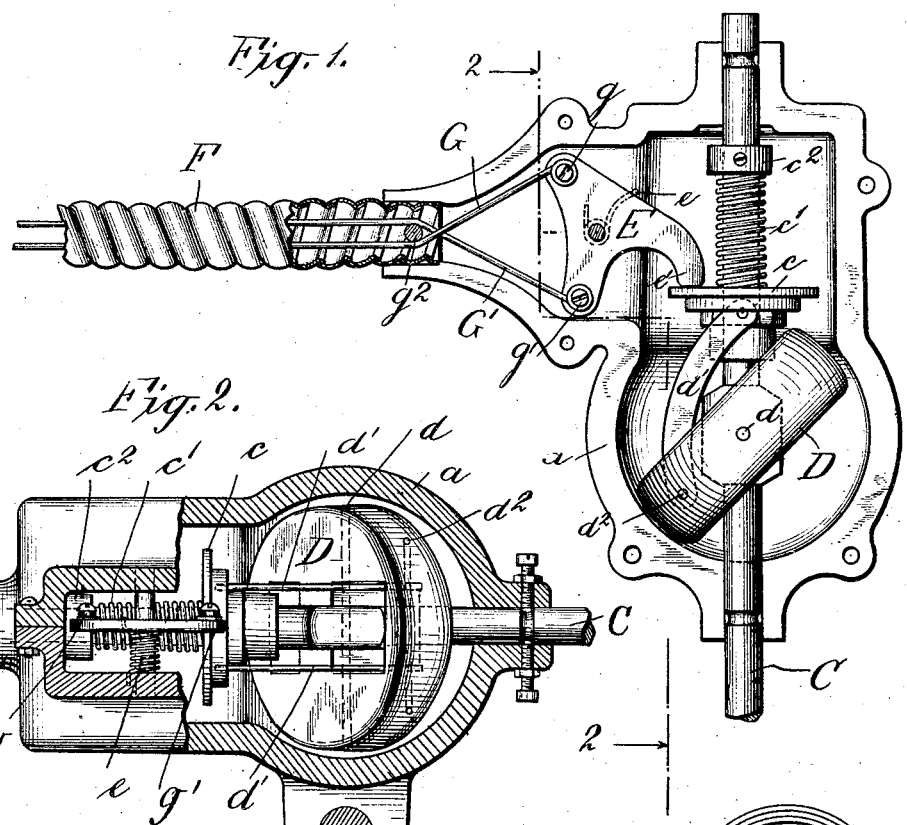
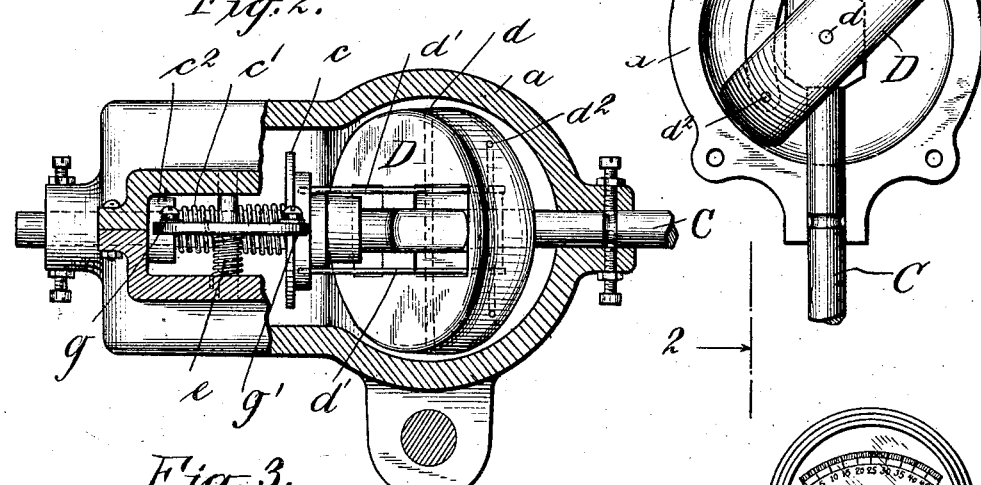
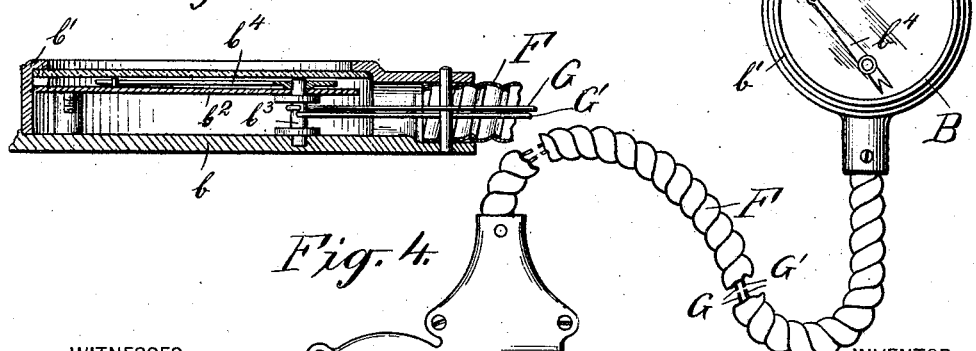
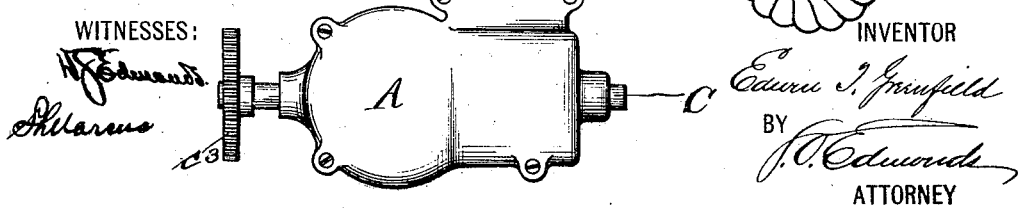
WITNESSES:
INVENTOR
Edwin T. Greenfield
BY
ATTORNEY

UNITED STATES PATENT OFFICE.

EDWIN T. GREENFIELD, OF KIAMESHA, NEW YORK.

SPEED-INDICATOR.

No. 888,705.  Specification of Letters Patent.  Patented May 26, 1908.

Application filed June 22, 1907. Serial No. 380,210.

*To all whom it may concern:*

Be it known that I, EDWIN T. GREENFIELD, a citizen of the United States, residing at Kiamesha, in the county of Sullivan and State of New York, have invented a certain new and useful Improvement in Speed-Indicators, of which the following is a specification.

This invention relates to instruments for indicating speed, adapted particularly for use on self-propelled vehicles.

The object of the invention is to provide an instrument of this type which may be manufactured at low cost, which may be easily installed and conveniently arranged upon an automobile, which shall give accurate indications and in which the indicator does not have a quick, jerky movement over its dial, such as would render accurate reading of the indications difficult, but has a steady movement corresponding accurately to changes in the speed which is to be indicated.

In accordance with the invention, I employ a controlling device driven by a wheel or shaft of the vehicle and preferably arranged on one of the axles thereof, and an indicating instrument which is connected to this controlling device and which is preferably mounted upon the dash-board of the vehicle. The controlling device has a part therein actuated by centrifugal force, and this is positively connected to the index of the indicating instrument, so that the two parts have corresponding movement. In this way, the employment of a flexible rotary shaft connecting the part mounted upon the axle of the vehicle with the indicating instrument mounted upon the dash-board is avoided, and it is due largely to this that the above-enumerated objects are attained and an instrument provided which is superior to those which have been formerly used, all of which have failed in one or more of the respects above noted.

The preferred embodiment of my invention is illustrated in the accompanying drawings, in which Figure 1 is an elevation, partly in section, of the controlling device with one half of the casing removed; Fig. 2 is a section on the line 2—2 of Fig. 1; Fig. 3 is a central section through the indicating instrument; and Fig. 4 is a view in elevation of the entire speed-indicator.

Referring to the drawings, the indicator consists of a controlling device A, the casing of which is preferably formed to facilitate mounting it upon a shaft of the vehicle, and an indicating instrument B adapted to be mounted on the dash-board of the car. The casing $a$ of the controlling device is formed to provide bearings for a shaft C, on which a body D is pivoted at $d$. Loosely mounted on shaft C is a collar $c$ against the face of which bears a spring $c'$ coiled about shaft C and having its other end bearing against a collar $c^2$, which is fixed upon shaft C. The loose collar $c$ has one end of each of a pair of links $d'$ pivotally connected thereto, the other ends of these links being pivotally connected to the body D at $d^2$. By reason of this arrangement of the parts, the spring $c'$ acts upon the loose collar $c$ to force it away from the collar $c^2$ and thus through the links $d'$ to turn the body D on its pivot $d$ to the position in which it is shown in Fig. 1. However, when shaft C is rotated, the body D is actuated by centrifugal force to move toward a position in which it lies perpendicular to the axis of shaft C. This shaft has mounted thereon, outside the casing $a$, a gear $c^3$ adapted to mesh with a gear secured upon the shaft or wheel which is to actuate the indicator.

Pivotally mounted within the casing $a$ is a bell-crank lever E, and a spring $e$ coiled about the pivot of this lever and having one end fixed to the casing and the other carried around the edge of the lever holds the end $e'$ of lever E in contact with the loose collar $c$ on shaft C. Opposite the lever E, the casing $a$ has an opening therein, in which is secured one end of a length of flexible tubing F, the other end of which is similarly secured in a suitable boss on the indicating instrument B. Any form of flexible tubing may be employed for this purpose, but preferably I employ "Greenfield tubing" formed of spiraled strip-metal. The indicating instrument B consists of a base $b$ and cover $b'$, the latter having a glass plate set therein.

Mounted on the base B, is a plate $b^2$, on which a suitable scale is marked out. A shaft $b^3$ is journaled in suitable bearings in the base $b$ and plate $b^2$ and extends through the latter, its upper end carrying an index $b^4$. The shaft $b^3$, carrying the index, is connected to the lever E in the controlling device, so that movements of the lever effect corresponding movements of the indicator. For this purpose, two wires G, G' are employed, each connected to the end of an arm of the lever E at $g, g'$, Fig. 1. These wires extend through the flexible tubing F and at their opposite ends are carried partially around and secured to the shaft $b^3$ of the indicating instrument. Preferably, two posts $g^2$ are provided in the flexible tubing F to guide the wires G, G'. Suitable strands, as, for instance, of gut, may be employed in place of the wires G, G', but I find in practice that best results are obtained with the use of piano wire. Also two flexible tubes of small diameter may be employed, one for each of the wires G, G', and these may be inclosed by a length of flexible tubing such as that shown at F. When two such flexible tubes are employed, the strands G, G' are held apart at all points throughout their lengths and bending of the tube F in any direction and at any number of points does not cause a variation in the position of the index relatively to its scale.

With the instrument thus constructed, the controlling device is mounted in position and geared to a wheel of the vehicle or a rotary shaft, and the indicating instrument is mounted on the dash-board. The flexibility of the tube F and the wires extending therethrough allows for the necessary relative movement of the parts on which the controlling device and instrument are mounted. As the shaft C is rotated, the body D turns on its pivot between the position in which it is shown in Fig. 1 and a position in which it lies perpendicular to shaft C, under the influence of centrifugal force, in exact accordance with changes in the speed of rotation of shaft C. These movements of the body D move the collar $c$ axially upon shaft C and turn the lever E on its pivot against the tension of springs $c'$ and $e$. As the lever E turns, the shaft $b^3$ in the indicating instrument is correspondingly turned by means of the wires G, G', and the index $b^4$ is caused to assume a position relatively to the scale marked out on plate $b^2$ which corresponds exactly with the speed of rotation of shaft C.

I have found in practice that with this form of speed-indicator very superior results are obtained, the indications being quite accurate and the movements of the index over the scale being quite steady. This results largely from having the controlling device connected directly with the wheel or rotary shaft and positively connected to the indicating instrument, in preference to carrying motion from the wheel or shaft by means of a flexible rotary shaft to a combined centrifugal controlling device and indicator mounted upon the dash-board of the car. Furthermore, the instrument is small and compact in construction and can be manufactured at a low cost.

Having now described my invention, what I claim as new therein and desire to secure by Letters Patent is as follows:—

The combination of a controlling device comprising a two-part casing having bearings formed therein, a shaft journaled in said bearings, a gear on said shaft outside the casing for driving the same, a body pivotally mounted on said shaft, a collar loose on the shaft, a spring for positioning the collar, a link connecting the collar and body, and a lever pivoted on said casing and engaging the collar, said body, collar, spring, link and lever being within the casing, an indicating instrument having an index movable relatively to a scale, a flexible tubing having one end communicating with an opening in said casing and the other end connected to said indicating instrument, and two wires extending through said tubing and connected at one end to said lever and at the other to said index, said wires being arranged to turn said index in opposite directions, substantially as set forth.

This specification signed and witnessed this 17th day of June, 1907.

EDWIN T. GREENFIELD.

Witnesses:
 D. G. EDMONDS,
 G. O. EDMONDS.